Nov. 19, 1968
B. VER NOOY
3,411,384
DRILLING APPARATUS
Filed June 16, 1966
2 Sheets-Sheet 1
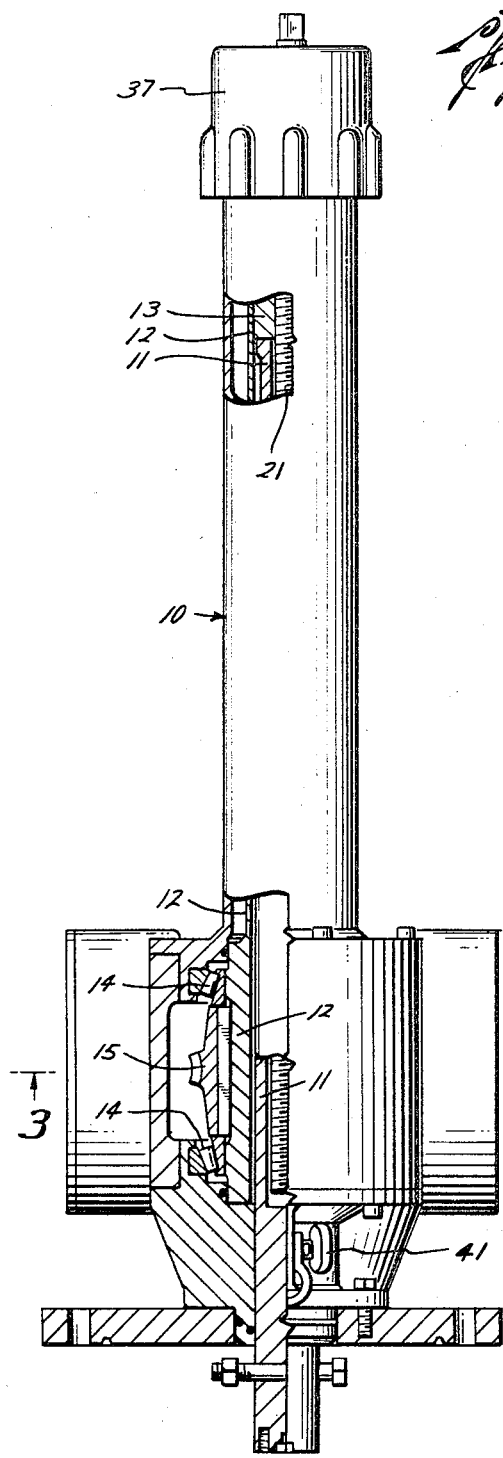
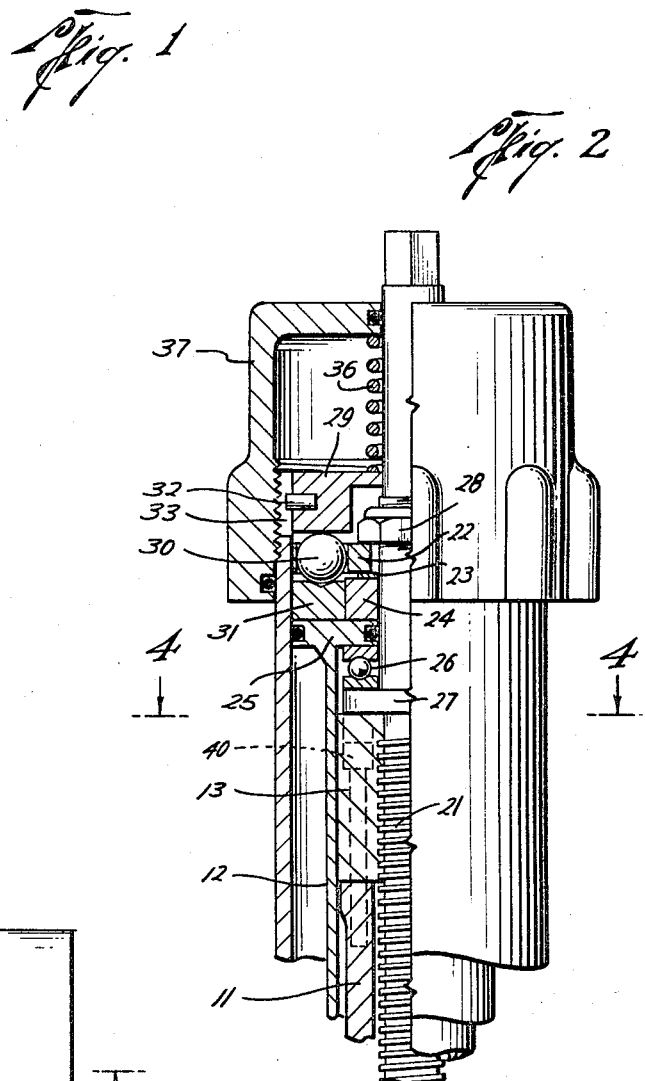
Burton Ver Nooy
INVENTOR.
BY Browning, Simms,
Hyer + Eickenroht
ATTORNEYS Burton Ver Nooy
INVENTOR.

United States Patent Office 3,411,384
Patented Nov. 19, 1968

3,411,384
DRILLING APPARATUS
Burton Ver Nooy, Broken Arrow, Okla., assignor to
T. D. Williamson Inc., Tulsa, Okla.
Filed June 16, 1966, Ser. No. 558,141
10 Claims. (Cl. 77—37)

ABSTRACT OF THE DISCLOSURE

This invention relates to a hot tapping apparatus wherein a boring bar and bit are fed into a workpiece responsive to relative rotation between the boring bar and a feed drive. Such relative rotation is controlled by a slippable frictional drive between the boring bar and the feed drive which tends to prevent such relative rotation and therefore tends to prevent feeding of the boring bar and bit toward the workpiece. A slippable frictional holding connection is provided between the apparatus housing and the feed drive tending to overcome the frictional drive connection thereby causing the boring bar to feed toward the workpiece.

---

This invention relates to an apparatus for drilling a hole or opening in a vessel, such as a pipe or the like, while preventing any substantial flow of fluid into or out of the vessel.

The cutting or drilling of a hole through the wall of a vessel or pipe while the same contains a fluid under pressure is commonly termed "hot tapping." Such tapping is usually performed in those instances where it is desired to make a connection to the vessel or pipe without taking the latter out of operation and removing pressure or fluid from it. For example, hot taps are often resorted to in connecting into a pipeline carrying a petroleum fluid so as not to be forced to shutdown the pipeline, drain and steam the same and then place it back in operation after a connection has been made. These hot taps are usually made by first welding a stub pipe or a split T to the vessel or pipe to be tapped and then mounting a tapping valve on the stub or on the branch of the T. The tapping apparatus is next mounted on the valve and its cutter run through the open valve to cut the opening in the vessel or pipe. After the opening has been cut, the cutter is retracted and the valve closed after which the tapping apparatus can be removed without any substantial leakage of fluid into or out of the vessel.

While tapping or drilling apparatus for performing this function is available upon the open market today, only the smaller sizes are of relatively simple construction. The larger tapping machines are relatively more complicated and expensive to build. The greater degree of complexity of the larger tapping machines inevitably results in their being of substantial weight so that their use is proportionately difficult. It is therefore an object of this invention to provide a drilling or tapping apparatus which can be constructed not only in smaller but also in larger sizes and which is still relatively simple and easy to construct and operate and which can be of relatively light weight and yet be able to withstand high fluid pressures which may be encountered in cutting a hole or making a hot tap.

Another disadvantage of the prior large tapping machines has been that they have involved a positive drive in that the cutter is advanced a predetermined distance for each revolution thereof regardless of the ease or difficulty of cutting. In other words, the cutter is fed into the work piece at a constant lineal feed rate during both the light and heavy cutting duties. As a result, the cutter is fed too slowly during the light cutting duty and too fast during the heavy cutting duty. It is therefore another object of this invention to provide a tapping machine which can be built in not only smaller but also in larger sizes and in which a simple arrangement is provided so that the feed rate is automatically varied to maintain substantially constant the cutter drilling force exerted on the work piece during the drilling operation whereby the feed rate can increase during the period of light drilling duty and decrease during the period of heavy drilling duty.

Another object of this invention is to provide an apparatus wherein the object of the foregoing object is accomplished and yet in which the driving means for the apparatus can be located near the bottom thereof whereby the apparatus can be made quite long and yet a substantial portion of the weight of the apparatus will be located close to the vessel being tapped where its bending effect on the apparatus is minimized.

Other objects, advantages and features of this invention will be apparent to one skilled in the art upon consideration of the specification, the claims and the attached drawings wherein:

FIG. 1 is an overall view of a preferred embodiment of the apparatus of this invention with portions being taken in vertical sections;

FIG. 2 is a partial sectional view of the upper part of the apparatus;

Figure 3:
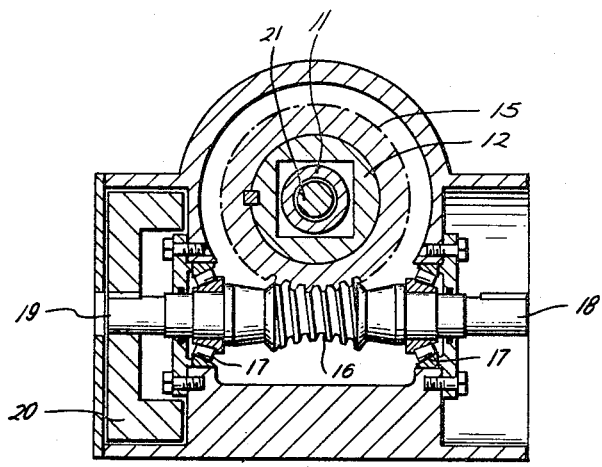
FIG. 3 is a section taken on the line 3—3 of FIG. 1.

The illustrated tapping machine includes a housing 10 in which a boring mechanism is rotatably mounted so as to be both rotatable and movable longitudinally of the housing. The illustrated boring mechanism includes a boring bar 11 for carrying a bit or cutter (not shown).

As the part of the boring mechanism, a means is provided for rotating the boring bar. This is illustrated as including a drive tube 12 receiving the boring bar and having a noncircular (e.g. square) cross-section telescoping with the correspondingly shaped section of the boring bar, here illustrated as nut 13. The drive tube is rotatably mounted in the housing by suitable thrust bearings 14 near its lower end. With this arrangement, it can be seen that by rotating the drive tube, the torque will be transmitted through the nut to the boring bar to rotate it. Since the nut is freely slidable in the drive tube, it will be seen that the boring bar can also be reciprocated longitudinally of the drive tube in a manner to be later described.

Means are provided for rotating the drive tube and this can include a worm gear 15 keyed to the drive tube and driven by a worm 16. The latter can be rotatably mounted in the housing by suitable bearings 17 and has one end 18 to which a suitable motor can be connected to supply power and another end 19 to which a crank can be connected for manual actuation. A flywheel 20 can also be added to smooth out the power requirements.

A feed drive is connected to the boring mechanism for moving the boring mechanism longitudinally of the housing responsive to relative rotation between the boring mechanism and feed drive. The food drive can take the form of a feed screw 21 of a length at least equal to the desired travel of the boring bar and threaded to nut 13. It will thus be seen that when the boring bar and feed screw rotate in unison, the boring bar does not move longitudinally but when the rotation of the feed screw is slowed down or stopped, the boring bar will be appropriately fed toward or away from the work piece.

Means are provided for controlling the relative rotation between the feed screw and boring bar so that the feed rate is automatically varied to maintain substantially constant the cutter drilling force exerted on the work piece during the drilling operation. This includes a means providing a slippable frictional drive connection between the boring mechanism and the feed drive. This means includes a spider 22 (described in more detail later), a spring washer 23 and a thrust bearing, which can be a ring as shown or a ball thrust bearing, 24 supported on the upper end 25 of the drive tube. Also, this upper end is connected via a ball bearing assembly 26 to a shoulder 27 on the feed screw to permit relative rotation between the drive tube and the feed screw but limiting longitudinal movement therebetween. With this arrangement, nut 28 on the feed screw can be tightened down to adjust the degree of frictional engagement between the drive tube and the feed screw. The desired degree of this adjustment will be described later.

Figure 5:
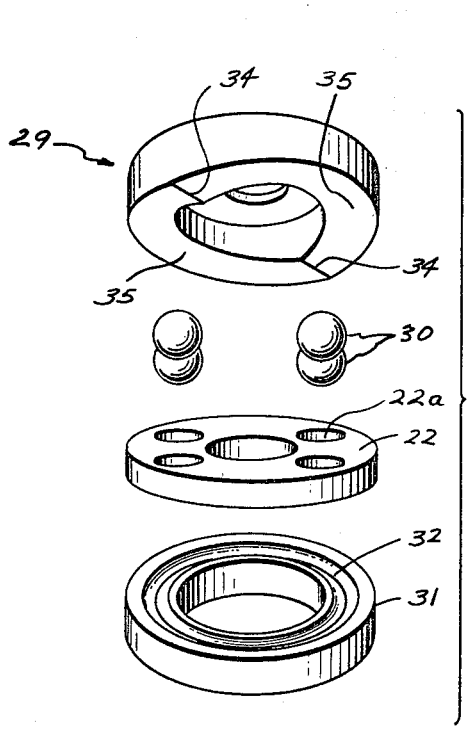
FIG. 5 is an exploded view of a part of FIG. 2.

Means are also provided for supplying a slippable frictional holding connection between the housing and the feed drive for exerting a holding force on the feed drive tending to overcome the frictional drive connection just described so as to cause relative rotation between the feed drive and the boring mechanism thereby causing longitudinal movement of the latter. This frictional holding mechanism is illustrated to include a first element in the form of a race 29 frictionally engaging a second element shown to include a plurality of ball bearings 30 and spider 22. The ball bearings are supported in a second race 31 having an annular groove 32 therein in which the balls are free to roll. The upper race 29 is free to move longitudinally in the housing but is prevented from rotating with respect to it by a pin 32 engaging a vertical slot 33 in the housing. Ball bearings 30 are disposed in openings 22a of spider 22, the latter being keyed to the feed screw so that it turns therewith. In order to provide a variable frictional holding connection, one face of race 29 is provided with cam surfaces such as illustrated more clearly in FIG. 5. In the preferred embodiment, the cam surfaces provide crests 34 alternating with valleys 35, the crest and valleys being shown as two in number and disposed 90° from each other. The surface of the face along the crests and valleys is substantially smooth and continuous so that as the ball bearings roll over this face, sudden impacts between the balls and the face are avoided. Resilient means, such as spring 36, is provided urging the race 29 toward the ball bearings and in a preferred form, this spring extends between the race and a cap 37 threaded to the housing so that the cap can be screwed up and down to change the force which the spring exerts against the race.

In assembly and operation, cap 37, spring 36 and race 29 should be removed and nut 28 tightened down so that the frictional connection between the drive tube and boring bar and the feed screw is sufficiently great that they turn in unison upon rotating the drive tube. The race, spring and cap are then replaced and the unit is ready to operate. In operation, the cap can be tightened down to the desired degree. Thus it can be tightened down until the holding friction completely overcomes the friction of the connection between the feed screw and drive tube when the cutter is disengaged from the work piece. Then the feed screw will not rotate when the boring bar is rotated and the latter will be fed at top speed toward or away from the work piece. When it encounters the work piece, the upward reaction on the boring bar will increase the friction between the nut 13 and the feed screw tending to cause the latter to turn. The resulting torque on the feed screw is counter-balanced by the friction between the ball bearings and the upper race minus the friction which was set by adjusting nut 28. When these various friction factors balance out, the feed screw will be turning at a certain fractional rate of the rotation of the boring bar. If the upward thrust on the boring bar increases as by increased drag on the cutter, the feed screw will slow down until the various friction factors come back into balance. On the other hand, if the cutter meets less resistance, the feed screw will speed up until balance is again attained. The point at which balance is attained can be adjusted by changing the compression of spring 36 by rotating cap 37. At any particular setting, the feed rate is automatically varied to maintain substantially constant the cutter drilling force exerted on the work piece so that the feed rate will increase during a period of light drilling duty and decrease during a period of heavy drilling duty. Moreover, the drilling force exerted on the work piece can be varied over a wide range by adjustment of cap 37.

The boring bar can be provided with a numbered scale along its length so that an operator can look through window 41 in the lower part of the housing to determine the distance the boring bar has traveled and hence its position. The scale is preferably made by grooving the numerals and markers in the bar and then filling the grooves with a suitable contrasting material so that the outer surface of the boring bar is smooth even where the grooves have been cut.

Figure 4:
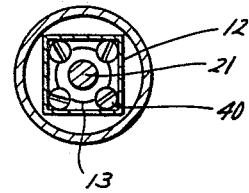
FIG. 4 is a section taken on the line 4—4 of FIG. 2.

While the constructional details of the machine not described above are believed to be apparent to one skilled in the art upon study of the drawings, it may be pointed out that nut 13 is shown as being fastened to the upper end of the boring bar by studs 40 (FIGS. 2 and 4) and are counter sunk so their heads are flush with the top of the nut.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an apparatus for drilling a hole in a vessel such as a pipe wherein a fluid-tight housing is provided for mounting a rotatable boring mechanism so as to drill a hole in a vessel while substantially preventing flow of fluid into or out of the vessel, the improvement which comprises in combination therewith of a feed drive connected to the boring mechanism for moving the boring mechanism longitudinally of the housing responsive to relative rotation between the boring mechanism and feed drive, means providing a slippable frictional drive connection between the boring mechanism and feed drive to tend to cause them to rotate in unison, and means providing a slippable frictional holding connection between the housing and feed drive for exerting a holding force on the feed drive tending to overcome said frictional drive connection so as to cause relative rotation between the feed drive and boring mechanism thereby causing longitudinal movement of the latter.

2. The apparatus of claim 1 wherein one of said means is adjustable so that the cutter drilling force can be varied.

3. The apparatus of claim 2 wherein the last mentioned means is so adjustable.

4. The apparatus of claim 1 wherein the last mentioned means includes first and second elements frictionally engaging each other and movable in a rotational manner relative to each other, said first and second elements respectively having connections with the housing and feed drive limiting relative rotation between the first element and housing and between the second element and feed drive but permitting relative rotation between the elements, and means urging the first and second elements into frictional engagement with each other.

5. The apparatus of claim 4 wherein said second element includes a plurality of ball bearings and the first element includes an annular race engaging the bearings and having cam surfaces engaging the bearings arranged such that upon movement of the bearings past the cam surfaces, the race is forced to move longitudinally, and resilient means urging the race toward the bearings to cause frictional engagement therebetween.

6. The apparatus of claim 5 wherein said cam surfaces have crests on a diameter of the race and valleys between the crests, said ball-bearings being equiangularly spaced apart and being twice the number of said crests so that as said bearings are moved along said cam surfaces, the resulting frictional engagement tends to be uniform.

7. An apparatus for drilling a hole in a vessel such as pipe comprising in combination, a fluid tight housing adapted to be mounted on a vessel to prevent flow of fluid into or out of the vessel, a drive tube in the housing, means for rotating the drive tube, a boring bar within the drive tube and having a nonrotatable but longitudinally movable connection therewith, a feed screw within the boring bar and threaded thereto, a slippable frictional drive connection between the feed screw and drive tube tending to cause the feed screw and drive tube to rotate together so as to prevent moving the boring bar longitudinally, a slipping frictional holding connection between the feed screw and housing for exerting a holding force on the screw tending to overcome said frictional drive connection to cause relative rotation between boring bar and feed screw such as to move the boring bar longitudinally.

8. The apparatus of claim 7 wherein the holding connection is a ball bearing assembly including a race movable longitudinally of the housing and nonrotatably connected thereto, said race having an annular face engaging a plurality of ball bearings, said face being contoured to provide alternate crests and valleys whereby movement of the ball bearings along such face causes each ball bearing to alternately pass over a crest into a valley and to longitudinally reciprocate said race, a spider connecting the ball bearings to the feed screw, and means resiliently biasing the race toward the ball bearings.

9. The apparatus of claim 8 wherein the number of ball bearings is twice the number of said crests.

10. The apparatus of claim 8 wherein means are provided for adjusting the amount of bias exerted by said resilient means.

References Cited

UNITED STATES PATENTS

| | | | |
|---|---|---|---|
| 1,216,284 | 2/1917 | Cash | 77—33.3 |
| 1,233,344 | 7/1917 | Groff | 77—33.3 |
| 2,322,237 | 6/1943 | Johansen | 77—33.3 |
| 3,068,725 | 12/1962 | Ver Nooy | 77—38 |

GERALD A. DOST, *Primary Examiner.*